July 16, 1963 M. H. DIEHL 3,098,120

VIDICON CAMERA INPUT STAGE

Filed Aug. 18, 1960

INVENTOR:
MAX H. DIEHL

BY Joseph P. Kates
HIS ATTORNEY.

3,098,120

VIDICON CAMERA INPUT STAGE

Max H. Diehl, Syracuse, N.Y., assignor to General Electric Company, a corporation of New York Filed Aug. 18, 1960, Ser. No. 50,361
6 Claims. (Cl. 178—7.2)

Figures 1, 2:
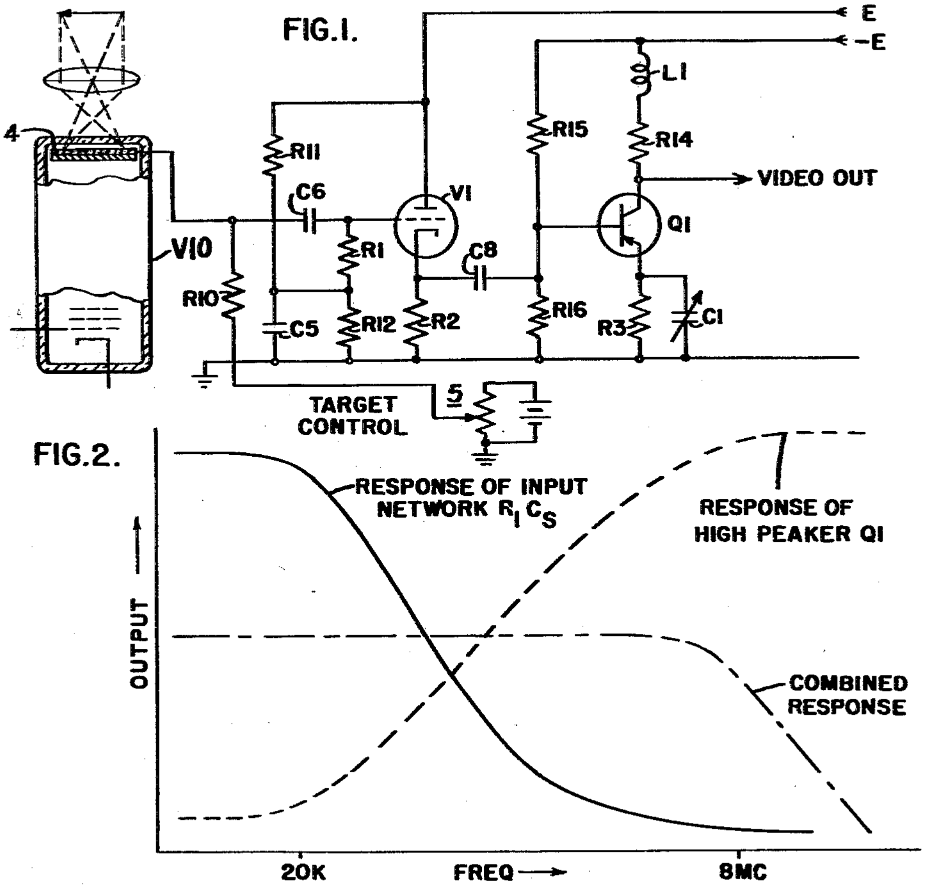

The present invention relates to a camera preamplifier and more particularly relates to a vidicon camera preamplifier circuit comprising a cathode follower tube stage and a transistor stage wherein the cathode follower stage minimizes microphonic noise and provides a low impedance input to the transistor stage and the transistor stage reduces random noise considerably, particularly when provided with low impedance input. The inventive circuit presents additionally, a high peaker arrangement to provide compensation for the frequency response of the input network and effect a flat wide response particularly above the about 20 kilocycle range.

Considerable noise from microphonics is present where prior art tube devices are used in the operation of television cameras, particularly cameras used in closed circuit TV applications. In closed circuit television applications considerabl shifting around or movement of the camera may take place. Consequent movement of the tube elements of the first stages in the camera preamplifier cause noise to be produced at the output.

Certain television camera circuits involving transistorized camera chain circuits produce considerable random noise because of the transistor arrangement.

The present invention overcomes these and other disadvantages of the prior art. It provides a device which is comparatively free from both random and microphonic noise. The invention extends the frequency response considerably by providing a special compensation circuit for the fall off of output voltage with frequency above the 20 kc. range where the input resistor into the television preamplifier is made very large. In this case stray capacitance across the input resistor causes this effect of falling off with frequency since the stray capacitance shunts a large portion of the signal to ground at the higher frequencies.

Accordingly an object of the present invention is to provide a television camera for industrial use which may be successfully operated in areas of high acoustical noise levels and which can withstand large amounts of shock and vibration without creating microphonics to obscure the scene being televized.

Another object of the present invention is to provide a television camera preamplifier especially adaptable for closed circuit television use wherein ambient noise and vibration and shock are present which preamplifier is comparatively free from microphonics noise components and which preamplifier has a good signal to noise ratio.

Another object of the present invention is to provide a television camera preamplifier which is free of microphonic noise; which has a high signal to noise ratio; which minimizes substantially the random thermal noise; and which provides compensation for fall off of response at high frequencies where there is present a relatively high value input resistance to the preamplifier circuit.

Figure 3:
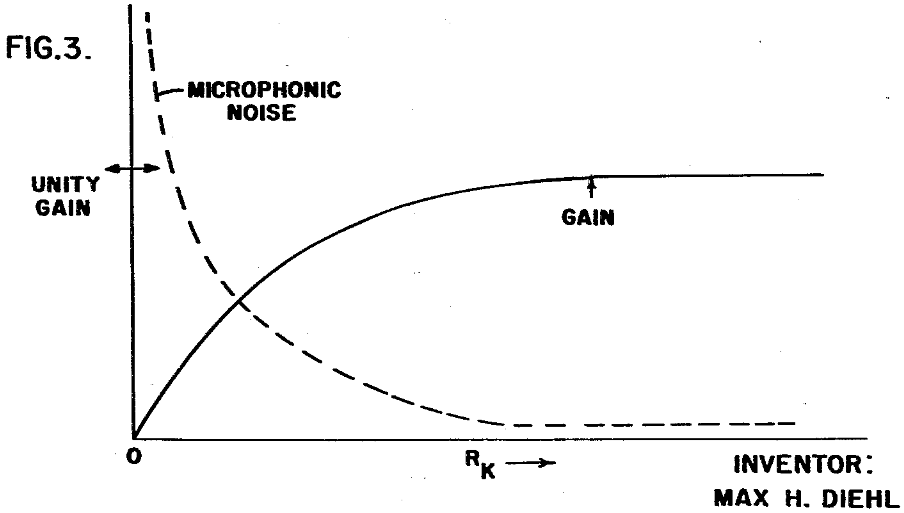

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic diagram of a preferred embodiment illustrative of the present invention, FIG. 2 is a schematic representation showing the frequency response which would occur in the absence of the peaking circuit of the device of FIG. 1 in solid line representation and the compensation effected by the high peaker circuit shown in the dashed line curve to effect the comparatively flat response shown in the interrupted dot and dash line and obtained upon inclusion of the high peaker circuit, and FIG. 3 is a graphical representation of the cathode follower effect on the gain of the stage and on the microphonics as the resistance of the cathode resistor becomes larger.

Referring to the diagram and in particular to FIG. 1, a source of positive voltage E and a source of negative voltage —E are provided. A vidicon tube V1 has a target electrode 4. Disposed between the target electrode 4 and a target control voltage source 5 is a resistor R10. Resistor R10 is of the order of 20 megohms. A triode stage V1 is provided and has an anode, a control electrode and a cathode. Disposed between the cathode of stage V1 and ground is a resistor R2. Disposed across source E in series (between the anode of stage V1 and ground) is a resistor R11 and a capacitor C5. The signal from the vidicon target electrode 4 is developed across target control resistor R10. A coupling capacitor C6 is disposed between electrode 4 and the control grid of stage V1. Capacitor C6 couples the vidicon target signal developed across resistor R10 to the grid of the cathode follower stage V1. A resistor R1 of relatively large value in the neighborhood of one-half a megohm is connected between the control electrode of stage V1 and the junction between restisor R11 and capacitor C5. Disposed between resistor R1 and ground is a resistor R12. Positive voltage is supplied to the anode of stage V1 from the source of positive voltage E. A transistor amplifier stage Q1 is provided having a collector, a base and an emitter. Transistor Q1 is a PNP transistor. Disposed between the emitter and ground is a peaking circuit comprising a resistor R3 and a variable capacitor C1. Disposed between source —E and the collector of transistor Q1 is a peaking coil L1 and a resistor R14 in series. Video output is taken from the collector of transistor stage Q1. Disposed between the source —E and ground is a voltage divider comprising a resistor R15 and a resistor R16 in series. The base of PNP transistor Q1 is connected to the junction between resistors R15 and R16 to provide correct bias for the transistor. A coupling capacitor C8 is disposed between the cathode of stage V1 and the base of transistor Q1.

The vidicon input circuit of the invention provides thus a cathode follower triode input stage V1 which is coupled to a transistor high peaker second stage Q1. By the combination of the cathode follower triode tube and the transistor amplifier following the cathode follower an extremely low noise factor is obtained. The A.-C. target load resistor R1 of the vidicon V10 has a very high value which improves the signal to microphonics ratio.

The vidicon tube V10 can be considered a constant current source. Therefore, the higher the resistance of the signal load resistor R1 the higher the signal voltage is which is developed at the grid of the preamplifier tube V1. It is desirable to have this voltage as high as possible within practical limits so as to be above the microphonics which exist.

The microphonic signals are present at low frequencies in the audio range. However, the large resistance R1 causes a large signal across the input at low frequencies. Therefore, the signal to (microphonic) noise ratio is large since the signal itself is large. At the higher frequencies the capacitance due to stray wiring capacitance plus the vidicon and preamplifier tube capacities causes a considerable fall off in signal voltage particularly above the 20 kilocycle range. However, this is compensated for by response of the transistor Q1 resulting from the resistor R3 and capacitor C1 peaking circuit.

The tube V1 and transistor Q1 are combined to give both low random noise and low microphonic noise. By employing a tube V1 as a cathode follower in the first stage the microphonic output is considerably reduced.

In a cathode follower stage, the gain of the stage is proportional to:

$$\frac{G_M R_K}{1+G_M R_K}$$

where:

$G_M$=tube transconductance
$R_K$=resistance of cathode resistor R2

If this stage were used as a tube amplifier stage (not a cathode follower) the microphonic output would, of course, be directly proportional to $G_M$ the transconductance. However, in the case of the cathode follower, if the resistor $R_K$ be made sufficiently large the effect of change of the transconductance $G_M$ will cause comparatively little noise effect. That is, as resistance $R_K$ is made large, i.e., as $R_K$ approaches infinity the numerator and denominator becomes a fraction which approaches one. Therefore, if the resistor R2 in the cathode follower is made sufficiently large, change of transconductance due to mechanical vibration will have comparatively little effect upon the gain of the stage. Thus unwanted electrical voltages or current produced by mechanical movement of the grid to cathode structure in a vacuum tube caused by acoustical noise (random sound pressure) or by shock or by abrasion is not amplified substantially by the cathode follower. It does not modulate the video signal which modulation is undesirable. Change in spacing between the grid and the cathode because of such vibration therefor, which causes a change in plate current and transconductance of the tube therefore does not produce the microphonic noise in the cathode follower. This effect is represented by FIG. 3 wherein $R_K$ is the resistance of resistor R2.

Following the cathode follower stage V1 is the transistor stage Q1. The transistor, because of its physical structure, is not microphonic. It has no grid or other elements which are free to move within its structure. However, the transistor presents the problem that when driven from a very high impedance generator, such as a vidicon camera stage, the signal-to-noise ratio, or random thermal noise, of the transistor is of appreciable magnitude.

That is, if the transistor were driven directly from the vidicon the signal-to-noise ratio would be too high because of internal noise generated in the transistor. In order to provide an input stage which has a good signal-to-noise ratio, and at the same time low microphonic noise, the transistor stage Q1 has been placed in cascade with the cathode follower stage V1. The cathode follower V1 thereby provides the low impedance input looking from the transistor Q1 necessary to minimize the internal noise of the transistor Q1. Thus the cathode follower V1 acts as an impedance transformer-like tube to properly drive the transistor stage Q1 for low random noise output.

The arrangement whereby the first stage following the vidicon is a cathode follower and drives a transistor which is connected as a common emitter stage is advantageous in several respects:

(1) If the resistance of the cathode resistor R2 of the cathode follower stage is high, the input capacitance is very low compared to the input capacitance of an amplifier stage. For example, the grid to plate capacitance $C_{GP}$ which represents almost the total capacity of a cathode follower is about 3 micromicrofarads. In the case of an amplifier stage this capacitance is approximately 30 micromicrofarads due to "Miller effect." In the case of a transistor the capacitance ranges between 30 to 100 microfarads. The low shunt capacity from grid to ground at the cathode follower input requires less high frequency gain in the following amplifier stage Q1. The signal-to-noise ratio is therefore better because the cathode follower V1 provides this low shunt capacitance and does not lower the response at higher frequencies, appreciably.

(2) If the resistance of the cathode resistor R2 is high, the change in output voltage produced by mechanical motion of the grid or cathode will not be directly proportional to the transconductance $G_M$ as in the case of an anode-follower. It is proportional to $$\frac{G_M R_K}{1+G_M R_K}$$

Therefore, if the cathode resistance is made extremely large, a change in transconductance $G_M$, as results from mechanical movement of the grid, has substantially no effect on the output voltage. The gain approaches one end the microphonic signal becomes smaller as the cathode resistor is made larger (see FIG. 3).

(3) Because of the low output impedance of the cathode follower $$\left(R_o \cong \frac{1}{G_M}\right.$$

$R_o$ is the resistance at the output and is approximately 100 ohms typically), a good impedance match is obtained into the transistor. The transistor input impedance is in the neighborhood of 100 to 1000 ohms which matches closely the 100 ohms output impedance of the cathode follower. With this good match the transistor is operated substantially at its minimum noise condition. When driven from this low impedance, the transistor also exhibits less $$\frac{1}{F}$$

noise, that is, noise in the low or middle audio range which noise is very objectionable in video displays.

(4) Optimum overall effects of signal to microphonics noise and signal to random noise are obtained because of the overall inventive circuit arrangement. It is as good as a tube preamplifier at providing a good signal-to-noise ratio for random noise and it approaches the performance of a transistor preamplifier in elimination of microphonic noise. It does not have the disadvantages of either a tube or a transistor preamplifier.

Since the second stage, the transistor Q1, is also the high peaker, a very high resistive load R1 can be used in the vidicon target circuit. Since the vidicon is a constant current device a larger signal voltage will be developed at the grid of stage V1. The signal to microphonics ratio is proportionally improved then because resistor R1 in the vidicon target circuit is made large. Under high light level conditions, the signal level at low frequencies can be so large as to overload any stage of amplification following stage V1. Therefore, because of the large value of resistor R1, the high peaker should follow the input stage VI immediatley. Therefore, the high peaker is placed in the emitter of transistor stage Q1 to take care of the problem of possible current saturation under high light level conditions.

Referring to stage Q1 the peaker circuit comprises the parallel impedances of resistor R3 and variable capacitor C1 disposed between the emitter of transistor Q1 and ground. The peaker circuit operates as follows: Resistor R3, in the emitter circuit of stage Q1 has a resistance of 3900 ohms. At low frequencies resistor R3 makes stage Q1 highly degenerative. Therefore little amplification results at low frequencies. Because of this degeneration very little low frequency signal reaches the video output stage and this eliminates virtually the low frequency noise frequencies. As the frequency increases, the reactance of capacitor C1 decreases causing substantial bypass to ground at the higher frequencies.

Referring to FIG. 2 at low frequencies attenuation is caused by degeneration through resistor R3 until the knee of the lower curve is reached at about 20,000 cycles (20 k.c.). At this point the reactance of capacitor C1 (the impedance of capacitor C1 due to its capacitive reactance)

becomes substantially equal to the impedance of resistor R3. This should match the knee of the upper curve of FIG. 2 which is due to the response to the input when the capacitive reactance (impedance due to the shunt capacitance) across resistor R1 becomes approximately equal to the impedance of resistor R1. After this point the rise and fall of the respective curves is approximately 6 db (decibels) per octave. Then until the high point of the curve which is represented at 8 megacycles is reached substantial compensation to produce the dot-dashed interrupted line combined response is provided. This shows the overall flat frequency response which is provided by the high peaker in conjunction with the input network in the inventive circuit. When the maximum gain of the transistor is reached and the reactance of capacitor C1 approaches zero, a second knee in the dashed curve results. This follows closely the approach starting at about 8 megacycles (mc.) of the variation of gain with frequency of the response of the input network R1 paralleled by the shunt capacitance $C_S$ which approaches zero asymptotically as the frequency increases above 8 mc.

Capacitor C1 is made adjustable in order to adapt the peaking circuit for possible overcompensation or undercompensation. This capacitor is adjusted so that the knee of the dashed curve showing the response of transistor Q1 resulting from the resistance R3 and the capacitor C1 occurs at the same frequency as the response of the input resistor R1 paralleled by the shunt capacity $C_S$ thereacross.

The invention provides a circuit capable of providing smooth flat response over a wide variety of input frequencies and wherein effects of random noise are minimized by the impedance match effected by inserting a cathode follower stage between the vidicon stage and a transistor emitter follower circuit. The inventive circuit eliminates noise due to microphonics also because of the cathode follower stage. The cathode follower stage when provided with a suitably large cathode resistor enables minimization of effects of variation in gain because of mechanical stress or shock changing the location of elements with respect to one another.

While in no wise to be considered as limiting the invention the following table of values is representative of an illustrative embodiment of the invention:

| Part: | | Value or designation |
|---|---|---|
| Tube V1 | | 6021 |
| Vidicon tube V10 | | 7226 |
| Transistor Q1 | | 2N502 |
| Resistor— | | |
| R1 | ohms | 500K |
| R2 | do | 2200 |
| R3 | do | 3900 |
| R10 | do | 20M |
| R11 | do | 3.9M |
| R12 | do | 1.0M |
| R14 | do | 1800 |
| R15 | do | 18K |
| R16 | do | 16K |
| Capacitor— | | |
| C1 | (variable) | 2000–2500 μμf. |
| C5 | | .10 μf. |
| C6 | | .01 μf. |
| C8 | | 20 μf. |
| Inductor L1 | microhenries | 22 |

Legend: μ=micro; μμ=micromicro; M=meg or million; K=thousand.

While a specific embodiment of the invention has been shown and described, it should be recognized that the invention should not be limited thereto. It is accordingly intended in the appended claims to claim all such variations as fall within the true spirit of the invention.

What is claimed is:

1. A television camera preamplifier comprising a camera tube, a cathode follower tube stage responsive to said camera tube, a transistor stage responsive to the output of said cathode follower tube stage, said cathode follower stage eliminating microphonic noise and providing a low impedance input to the transistor stage, said transistor stage thereby reducing random noise.

2. The apparatus of claim 1 including a large input resistor in the input circuit of said cathode follower, said transistor stage being connected in common emitter configuration, a peaking circuit in the emitter circuit to provide compensation for fall off of output voltage with increase in frequency due to stray capacitance across the input resistor at high frequencies to thereby provide flat frequency response over a wide range of frequencies.

3. A television preamplifier comprising a camera tube, a cathode follower stage coupled to the output of said camera tube, a first resistor of relatively large value disposed in the input to said cathode follower, a second cathode load resistor therefor disposed in the cathode circuit of said cathode follower selected to achieve near unity gain, a common emitter transistor stage coupled to the output of said cathode follower, and a peaking circuit in the emitter circuit of said transistor.

4. A vidicon preamplifier comprising a vidicon tube, a cathode follower stage having a resistance in the cathode circuit selected to provide near unity gain responsive to output of said vidicon stage, a relatively large resistor disposed at the input to said cathode follower, a transistor stage having an emitter, a peaking circuit in said transistor emitter circuit responsive to output from said cathode follower, said cathode follower minimizing the effects of vibration and noise, said transistor amplifier stage minimizing the effects of random noise, said peaking circuit providing for flat frequency response over a comparatively large range of input frquencies.

5. In a television camera including a vidicon tube and a large value resistor in the output circuit of said vidicon, a preamplifier comprising a cathode follower, a first large resistor disposed in the input circuit of said cathode follower, a resistor in the cathode circuit of said cathode follower selected to provide near unity gain, a transistor common emitter connected stage coupled to the output of said cathode follower, a peaking circuit in the emitter circuit of said transistor stage comprising a third resistor and a variable capacitor, said preamplifier thereby presenting a circuit of optimum freedom from random and microphonic noise.

6. The apparatus of claim 5 wherein said cathode follower input resistance is of the order of one-half megohm and said cathode follower cathode resistance is of the order of thousands of ohms.

References Cited in the file of this patent

UNITED STATES PATENTS 2,961,574 Brenholdt ............ Nov. 22, 1960

OTHER REFERENCES

Publications: No. 1 "Television System for Stratoscope I," Flory et al., Electronics, June 17, 1960, pages 49–53. No. 2 "Transistorized TV Cameras Using Miniature Vidicon," Flory et al., RCA Review, December 1956, vol. VXII, No. 4, pages 469–502.